US000001276H

United States Statutory Invention Registration [19]

[11] Reg. Number: H1276

Bogner et al.

[43] Published: Jan. 4, 1994

[54] CURABLE, STYRENE-CONTAINING RESIN COMPOSITIONS HAVING REDUCED STYRENE EMISSIONS

[76] Inventors: Ben R. Bogner, 1144 N. President St., Wheaton, Ill. 60187; James F. Van Fleet, 261 Breckenridge Dr., Aurora, Ill. 60504

[21] Appl. No.: 740,593

[22] Filed: Aug. 5, 1991

[51] Int. Cl.[5] ..... C08K 5/00
[52] U.S. Cl. ..... 523/511; 524/366
[58] Field of Search ..... 524/461, 487

[56] References Cited

U.S. PATENT DOCUMENTS 4,046,726 9/1977 Meiner et al. ..... 524/77

FOREIGN PATENT DOCUMENTS 369683 5/1990 European Pat. Off. .

*Primary Examiner*—Robert L. Stoll

*Assistant Examiner*—Joseph D. Anthony

[57] ABSTRACT

This invention relates to free-radical curable, styrene-containing resin compositions having reduced styrene emissions. More particularly, the invention relates to free-radical curable, styrene-containing resin compositions having reduced styrene emissions comprising: (a) a polymerizable alpha, beta-ethylenically unsaturated carboxylate resin, which is dissolved in styrene; (b) a paraffin wax; and (c) a fluorocarbon surfactant.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CURABLE, STYRENE-CONTAINING RESIN COMPOSITIONS HAVING REDUCED STYRENE EMISSIONS

This invention relates to thermoset resins. More particularly, this invention relates to free-radical curable, styrene-containing resin compositions.

BACKGROUND OF THE INVENTION

Free-radical curable, styrene-containing resins are well-known to those skilled in the art and widely available from commercial sources. Such resins include, for example, styrene-containing unsaturated polyesters, vinyl esters and urethane acrylates or methacrylates. All of these resins are alpha, beta-ethylenically unsaturated carboxylates. These resins, especially unsaturated polyesters, can be easily adapted to many common thermoset molding techniques for the construction and transportation industries, including the manufacture of parts for automobiles, trucks, boats, machine housings and household items such as bath fixtures. Another application for such resins is in the construction of tanks, piping and process equipment for chemicals and chemical waste such as underground gasoline storage tanks. These resins are selected as a replacement for metals such as steel, stainless steel, aluminum and bronze because of their ability to resist corrosion and chemical attack. Therefore, it is desirable to provide such resins which, when molded, have good toughness, impact and adhesion properties as well as hydrolytic, thermal and chemical resistance.

However, styrene emissions associated with the manufacture of free-radical curable, styrene-containing resins are now limited by regulations promulgated in 1989 by the U.S. Occupational Safety and Health Administration (OSHA). According to these regulations, manufacturers in many industries must reduce workplace styrene emissions from 100 parts per million to 50 parts per million. Environmental requirements issued by the South Coast Air Quality Management District (SCAOMD) in California apply to such resins and mandate that styrene emissions must be less than 60 grams per square meter of styrene by a paint can lid test described below.

In order to meet new environmental regulations, manufacturers of styrene-containing resins might either reduce the styrene monomer content of resins or suppress emissions from existing styrene-containing compositions. The problem with lowering the styrene content is that styrene functions to provide a workable viscosity of the resin and to crosslink with the unsaturation in the resin, such as a polyester polymer backbone. Therefore, lowering the amount of styrene in the resin will have an impact on other properties.

Several approaches to lowering styrene emissions have been tested without success. One approach is to lower the molecular weight of the resin in order to reduce the amount of styrene needed to obtain a workable resin viscosity. The problem with this approach is that the flexural strength of the resin is greatly decreased, particularly when tested after exposure to high temperatures or chemical exposure. Another approach to reducing emissions in unsaturated polyester resins is to substitute part of the styrene with another additive such as hydroxyethyl methacrylate or methyl methacrylate. However, neither of these substitutes works as well as styrene in most applications. For example, chemical resistance of a polyester resin is lower in a hydroxyethyl methacrylate additive system. Similarly, vinyl toluene has been tested as a substitute for styrene in unsaturated polyesters. While it appeared that the styrene emissions and interlaminar adhesion were acceptable, this system could not be used at workable viscosity levels which would also meet styrene emission requirements.

The general object of this invention is to provide free-radical curable, styrene-containing resin compositions having reduced styrene emissions. It is another object of the invention to provide such resins with reduced styrene emissions without significantly affecting the preparation, processing and physical properties of the resins when used in molding processes. It is another object to provide a simple, inexpensive method for making such resin compositions. It is yet another object to provide molded articles having good physical properties which are made from such compositions. Other objects appear hereinafter.

These and other objects are achieved by the addition of a small amount of a paraffin wax and a fluorocarbon surfactant to a free-radical curable, styrene-containing polymerizable resin composition. Unexpectedly, it has been found that compositions containing a paraffin wax and a fluorocarbon surfactant have lower styrene emissions without significantly affecting preparation, processing, and physical properties, particularly chemical and hydrolytic resistance and interlaminar adhesion of the cured or polymerized resin compositions.

SUMMARY OF THE INVENTION

The invention is a free-radical curable, styrene-containing resin composition having reduced styrene emissions comprising:

(a) a polymerizable alpha, beta-ethylenically unsaturated carboxylate resin, which is dissolved in styrene;
(b) a paraffin wax; and
(c) a fluorocarbon surfactant;

wherein said paraffin wax and said fluorocarbon surfactant are provided in amounts sufficient to reduce said styrene emissions without significantly affecting physical properties of said resin compositions, such as interlaminar adhesion and hydrolytic and chemical resistance.

In a preferred embodiment, the resin composition of the invention comprises about 0.05 to about 0.3 wt. % paraffin wax, and preferably about 0.1 to about 0.2 wt. % paraffin wax. In another preferred embodiment, the concentration of the fluorocarbon surfactant comprises about 0.001 to about 0.1 wt. % fluorocarbon surfactant, and preferably about 0.005 to about 0.09 wt. % fluorocarbon surfactant. The invention also comprises methods for making such improved resin compositions. In a preferred method, the unsaturated polymerizable resin dissolved in styrene is mixed with the paraffin wax and the fluorocarbon surfactant.

DETAILED DESCRIPTION OF THE INVENTION

This invention applies to free-radical curable resin compositions containing styrene. As used herein, the term "free-radical curable, styrene-containing resins" means liquid resin compositions containing styrene which are transformed from a liquid to a gel or solid state at the time of molding or casting by crosslinking via free-radical-initiated vinyl addition polymerization. For example, crosslinking of reactive sites in styrene-containing unsaturated polyester resins occurs via vinyl addition polymerization of ethylenically unsaturated styrene monomer and the alpha, beta olefinically unsaturated moieties of the polyester.

Examples of free-radical curable, styrene-containing resin compositions to which the invention applies are styrene-containing unsaturated polyesters, vinyl esters and urethane acrylates and methacrylates. These resins are widely commercially available and well known to those skilled in the art.

Unsaturated polyester resins useful in the invention may be oligomers obtained by the condensation reaction of at least one unsaturated di- or polycarboxylic acid or anhydride with at least one di- or polyhydric alcohol, and, preferably, at least one saturated or aromatic di- or polycarboxylic acid or anhydride. Typical unsaturated di- or polycarboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of di- or polyhydric alcohols which are useful in the invention include neopentyl glycol, ethylene glycol, diethylene glycol, triethylene glycol, propylene glycol, dipropylene glycol, 1,4-butanediol, polyethylene glycol, mannitol, 1,2-propanediol, 1,6-hexanediol, 1,3-butylene glycol and mixtures thereof, with propylene glycol being preferred. Typical di- or polycarboxylic acids include isophthalic acid, orthophthalic acid, terephthalic acid, succinic acid, adipic acid, chlorendic anhydride and mixtures thereof, with isophthalic acid being the preferred choice. Typical molecular weights of unsaturated polyesters (on a solid basis) useful in the instant invention are between about 1000 and about 2500 g/mole. The polyesters typically are dissolved in about 20–60 wt. % styrene monomer solution which usually contain polymerization inhibitors. Most preferred are unsaturated polyesters based on isophthalic acid, maleic anhydride and propylene glycol dissolved in about 30–50 wt. % styrene.

Vinyl ester resins useful in the invention are produced by the addition of an ethylenically unsaturated monocarboxylic acid to a backbone (usually epoxy-containing) producing terminal unsaturation and which can be cured with vinyl monomers similar to those used for crosslinking polyesters. Various epoxy resins are used, including the diglycidyl other of bisphenol A, or higher homologues thereof, the diglycidyl ether of tetrabromo bisphenol A, epoxylated phenol-formaldehyde novolac and polypropylene oxide diepoxide. The most commonly used acids are acrylic and methacrylic acids. The acid-epoxide reaction is straightforward and is catalyzed by tertiary amines, phosphines, alkalis or onium salts. The acid-epoxide reaction results in pendant hydroxyl groups which provide adhesion and/or reactive sites for further modification with compounds such as anhydrides or isocyanates. Vinyl ester resins are diluted with a reactive monomer such as styrene usually containing inhibitors. Vinyl ester resins useful in the invention are described in more detail by Anderson and Messick in *Developments in Reinforced Plastics*—1, pp. 29–57, Edited by G. Pritchard, Applied Science Publishers Ltd., London, 1980, which is incorporated by reference herein. One preferred vinyl ester resin useful in the invention is sold under the trademark Derakane 470 by The Dow Chemical Company, Midland, Mich. This resin is an epoxy novolac vinyl ester resin for high-temperature applications which has an epoxy resin based on phenol-formaldehyde novolac incorporated into the vinyl ester resin backbone, increasing the cross-link density when the resin is cured.

The urethane acrylate and methacrylate resins useful in the invention may be made by the reaction of a di- or polyisocyanate and a hydroxyalkyl acrylate or methacrylate with a di- or polyhydric alcohol. Examples of these resins are contained in U.S. Pat. No. 4,480,079 and in European Patent Application 86303822.0, which are incorporated by reference herein. In U.S. Pat. No. 4,480,079, there are described polyurethane polyacrylate or polymethacrylate resins derived from a hydroxyalkyl acrylate or methacrylate by reaction of hydroxyl groups thereof with the isocyanate groups of (i) a polyisocyanate free from urethane groups and having an isocyanate functionality greater than 2.0 or (ii) a urethane polyisocyanate derived from a polyisocyanate by reaction thereof with the hydroxyl groups of an aliphatic alcohol having up to 3 hydroxyl groups, the urethane polyisocyanate having an isocyanate functionality greater than 2.0. The described urethane acrylates are copolymerizable with a vinyl monomer which is methyl methacrylate, but these resins may also be dissolved in styrene containing at least one inhibitor.

The ethylenically unsaturated styrene monomers which may be used in the curable resins of the invention can be any ethylenically unsaturated styrene monomer capable of cross-linking the unsaturation in the resin via vinyl addition polymerization. The preferred monomer is styrene because it provides an economical monomer solution, is a good solvent for unsaturated resins and enables low viscosity at lower monomer levels.

The paraffin waxes which are useful in the invention include those with melting points between about 50°–700° C. (120°–1600° F.). One preferred paraffin wax is Eskar R-45 available from Amoco Oil Company, Chicago, Ill. This paraffin wax has a melting point of about 600° C. (1400° F.). The paraffin wax is added in an effective amount to reduce styrene emissions while preferably maintaining acceptable adhesion properties in the cured resin composition. The preferred concentration of paraffin wax is about 0.05 to about 0.3 wt. % of the total resinous components (i.e., resin and styrene monomer). It has been found that at paraffin levels below about 0.05 wt. %, styrene emissions were too high, and at levels above about 0.3 wt. %, adhesion properties of the resin composition, i.e., ability of individual layers of the resin composition to adhere to one another, were unacceptable. A most preferred concentration of paraffin wax is about 0.1 to about 0.2 wt. %, with the optimum preferred concentration being about 0.15 wt. % paraffin wax.

The fluorocarbon surfactants useful in the invention are preferably nonionic, ethoxylated fluorocarbons. Most preferred are fluorocarbon surfactants sold under the trademark Zonyl ® FSN and Zonyl FSN-100 by E. I. DuPont, Wilmington, Del. These fluorocarbon surfactants are described in more detail in DuPont Bulletin E-95556, December, 1988, and DuPont Bulletin H-00172, August, 1988, both of which are incorporated by reference herein. These fluorocarbon surfactants are of the formula $R_fCH_2CH_2O(CH_2CH_2O)_xH$, wherein $R_f=F(CF_2CF_2)_{3-8}$, and wherein x can be about 1–20. The fluorocarbon surfactant is added, in combination with the paraffin wax, in an effective amount sufficient to reduce styrene emissions while preferably maintaining acceptable adhesion properties in the cured resin composition. The preferred concentration of fluorocarbon surfactants useful in the invention is about 0.001 to about 0.1 wt. % of the total resinous components (i.e., resin and styrene monomer). At concentrations which are higher than about 0.1 wt. %, the adhesion properties of the resin were good, but the styrene emissions were too high. Below 0.001 wt. % fluorocarbon surfactant, the styrene emissions were satisfactory, but the adhesion properties of the resin were unacceptable. A most preferred concentration of fluorocarbon surfactant is about 0.005 to about 0.09 wt. %, with the optimum preferred concentration being about 0.01 wt. %.

Optionally, other additives such as catalysts, fibers, fillers, pigments, mold release agents, water scavengers, internal lubricants, low profile additives and other processing aids, all of which are well-known to those skilled in the art, can be added to the free-radical curable resin compositions of the invention. Preferably, a peroxide catalyst such as methylethylketone peroxide is used to catalyze the crosslinking of the resin and styrene monomer. Also, small amounts of organic cobalt initiators are preferably added to facilitate the catalyst breakdown.

Typically, in making the improved curable resin compositions according to the invention, a resin, such as an unsaturated polyester, vinyl resin or urethane acrylate, described above, is dissolved in styrene monomer. Next, an effective amount of paraffin wax and fluorocarbon surfactant are mixed together with the styrene-containing composition. The addition of paraffin wax and fluorocarbon surfactant can be made at the time of preparing the resin, which is preferred, or just prior to use by the resin end-user. The liquid resin is then used in a free-radical cured molding process such as hand lay-up, spray-up or other reactive molding processes to form useful molded products.

The invention described herein is illustrated, but not limited, by the following examples.

EXAMPLES

EXAMPLE 1

Unsaturated Polyester Resins Prepared with Paraffin Wax and Fluorocarbon Surfactant This example shows the preparation of an unsaturated polyester resin composition according to the invention.

An unsaturated polyester comprising equal molar parts of isophthalic acid and maleic anhydride with 10 mole percent excess propylene glycol was prepared according to the formulation shown in Table 1. This polyester resin formulation is described in Amoco Chemical Company Bulletins, isophthalic Acid, Bulletins IP-43b and IP-86a, available from Amoco Chemical Company, Chicago, Ill., which are incorporated herein by reference.

TABLE 1

Formulation of Unsaturated Polyester Resin

| | Mole ratio | Wt. % |
|---|---|---|
| Propylene Glycol | 2.20 | 44.3 |
| Isophthalic Acid | 1.00 | 44.0 |
| Maleic Anhydride | 1.00 | 26.0 |
| less 1st stage water | −2.00 | −9.5 |
| less 2nd stage water | −1.00 | −4.8 |
| Yield | — | 100.0 |
| Styrene Monomer | — | 100.0 |

The resin was processed using a two-stage method in a stirred heated batch reactor with a partial condenser and a total condenser. In the first stage, propylene glycol and isophthalic acid were charged to the reactor and heated to a maximum of 205° C. (400° F.) and reacted to an acid number less than 10. This prepolymer was then cooled to below 160° C. (325° F.) and the glycol loss was measured. Any loss was made up by the addition of propylene glycol.

In the second stage, maleic anhydride was charged to the reactor, heated to a maximum temperature of 230° C. (450° F.) and reacted to an acid number less than 10 and a Gardner-Holdt viscosity of V-X based on 60% nonvolatile material (NVM).

The polymerization mixture was then cooled to 205° C. (400° F.), and 150 ppm hydroquinone was added to inhibit the resin. The resin was hot blended at a temperature of about 160°-175° C. (325°-350° F.) to 50% NVM with styrene inhibited with 75 ppm (based on resin solids) p-benzoquinone. The properties of the resin are shown in Table 2.

TABLE 2

Properties of Unsaturated Polyester Resin

| | |
|---|---|
| Non-volatile Material, wt. % | 50.49 |
| Gardner-Holdt Viscosity | N-O |
| Brookfield Viscosity at 25° C., cP | 445 |
| Gardner Color | 7− |
| Hydroxyl Number (Solid) | 38.3 |
| Acid Number (solid), mg KOH/g | 9.5 |
| SPI Gel Test, 1% benzoyl peroxide at 82° C. | |
| Gel Time, min:sec | 5:11 |
| Cure Time, min:sec | 7:48 |
| Peak Exotherm | 239° C. (398° F.) |
| Styrene Emissions (By SCAQMD) | 120–140 g/sq meter |
| Interlaminar Adhesion | Excellent |

Next, 0.15 wt. % of a paraffin wax, melting point 600° C., available from Amoco Oil Company, Chicago, Ill. under the trademark Eskar R-45, was added to the above-described unsaturated polyester resin by first dissolving the wax in an equal amount of styrene (50:50 wt./Wt.), while warming to about 40° C., and then adding the wax in styrene to the unsaturated polyester resin at room temperature. interlaminar adhesion of the resin formulation with the addition of wax, but without the fluorocarbon surfactant, was poor.

Next, 0.01 wt. % of a fluorocarbon surfactant, available from E. I. DuPont, Wilmington, Del. under the trademark Zonyl FSN, was added to the polyester resin at room temperature. The formulation and results of styrene emissions and adhesion testing of this improved resin system are shown in Table 3.

The SCAQMD method of testing styrene emissions is issued by the South Coast Air Quality Management District, in the State of California and is a "paint can lid" test. Briefly, the SCAQMD method is a standard method for static volatile emissions which determines the % weight loss defined as % volatile emission of a polyester resin during its polymerization to gel under the condition of the test. Briefly, a sample of the unpolymerized resin is weighed onto a suitable container, preferably a gallon can lid of 14.5 cm diameter, from a triple tight can and allowed to stand for 30 minutes with weights being measured at intervals. The resin is catalyzed with an appropriate peroxide catalyst, such as methylethylketone peroxide, and the rate of loss and volatile emissions are then calculated. A sample of the polymerized form of the same resin is then weighed onto a suitable container with a paper clip added and allowed to stand until the sample has gelled with weights being measured at intervals. The rate of loss and volatile emissions are then calculated. The detailed procedure and calculations are available from the South Coast Air Quality Management District, Los Angeles, Calif., under the title "Standard Method for Static Volatile Emissions", revised Sep. 3, 1987, which is incorporated herein by reference. The acceptable limit for styrene emissions according to the South Coast Air Quality Management District is below 60 g/sq meter.

The interlaminar adhesion test procedure is as follows. A laminate of the resin is prepared and allowed to cure for 24 hours at room temperature. One-third of the cured resin is covered with Mylar, and a second laminate is applied and cured for 24 hours at room temperature. The completed laminate is post cured for two hours at 100° C. It is then cut into 4-inch wide sections, with the top third of each section containing the Mylar. The layers are separated and the surfaces are judged for adhesion by visual assessment of fiber tear. One hundred percent (100%) fiber tear is viewed as excellent adhesion, whereas 25% fiber tear is considered to be poor.

TABLE 3

Unsaturated Polyester/Paraffin Wax/Fluorocarbon Surfactant Resin System Formulation And Properties

| Reactants | Wt. % |
|---|---|
| Polyester Resin (50 NVM in Styrene) (1.0 M/1.0 M/2.20 M - MAN/IPA/PG, Eq. Wt. 2300) | 100.00 |
| Paraffin Wax | 0.15 |
| Fluorocarbon Surfactant | 0.01 |
| Cobalt Initiator (6 wt. % Cobalt) | 0.3 |
| Methylethylketone Peroxide (MEKP) Catalyst | 1.0 |
| Properties | |
| Styrene Emissions (By SCAQMD) | 22 g/sq meter |
| Interlaminar Adhesion | Excellent |

MAN = maleic anhydride
IPA = isophthalic acid
PG = propylene glycol

The small amounts of paraffin wax and fluorocarbon surfactant reduce styrene emissions without significantly affecting important physical properties such as interlaminar adhesion. A comparison of physical properties of an isopolyester resin made as described above, except that 1 wt. % benzoyl peroxide was used as catalyst, with and without the addition of a paraffin wax and fluorocarbon surfactant, are shown in Table 4. Cure conditions for the clear castings were as follows: 16 hrs at 57° C. (135° F.), 1 hr at 82° C. (180° F.), 1 hr at 104° C. (220° F.), 1 hr at 120° C. (248° F.).

TABLE 4

| Resin Formulation | Control (wt. %) | Sample (wt. %) |
|---|---|---|
| Polyester Resin (See Table 3) | 100.0 | 100.0 |
| Paraffin Wax | 0 | 0.15 |
| Fluorocarbon Surfactant | 0 | 0.01 |
| Methylethylketone Peroxide | 1.0 | 1.0 |
| **Liquid Resin Properties** | **Control** | **Sample** |
| NVM % | 50 | 50 |
| Styrene Emissions, gm/sq meter (by SCAQMD) | 127 | 34 |
| **Physical Properties of Clear Castings** | **Control** | **Sample** |
| Flex Modulus, 10 × 6 psi | .520 (.013) | .509 (.007) |
| Flex Strength, 10 × 3 psi | 15692 (1206) | 14904 (1200) |
| Tensile Modulus, 10 × 6 psi | .553 (.093) | .540 (.024) |
| Tensile Strength, 10 × 3 psi | 9948 (989) | 9553 (746) |
| Tensile Elongation, % | 2.3 | 2.1 |
| **6 Day (144 hrs) Water Boil Test** | **Control** | **Sample** |
| Flex Modulus, 10 × 6 psi | .447 (.012) | .454 (.011) |
| Flex Strength, 10 × 3 psi | 12566 (582) | 10942 (926) |
| Flex Modulus, % retained | 86.0 | 89.0 |
| Flex Strength, % retained | 80.0 | 76.0 |
| Weight Gain, % | 1.053 | 1.021 |

Flexural modulus and flexural strength were tested by ASTM method D 790. Tensile modulus, tensile strength and tensile elongation were tested by ASTM method D 638. The water boil method is as follows. The resin sample is placed in boiling water reflux at 100° C. for 6 days and then removed and tested for physical properties.

Table 4 demonstrates physical properties of resins made according to the invention are not significantly affected by addition of the paraffin wax and fluorocarbon surfactant.

EXAMPLE 2

Orthopolyester and Vinyl Ester Resins Prepared with Paraffin Wax and Fluorocarbon Surfactant Other examples of free-radical curable, styrene-containing resin compositions useful in the instant invention are an orthopolyester resin designated 1060-5, available from Reichhold Chemical, Jacksonville, Fla., and a vinyl ester resin designated Derakane 470 available from Dow Chemical Company, Midland, Mich. These resins have styrene emissions of 98 g/sq. meter and 110 g/sq. meter, respectively, before addition of the paraffin wax and fluorocarbon surfactant. The paraffin wax (0.15 wt. %) and fluorocarbon surfactant (0.01 wt. %) were added to these resins as described above to achieve reduced styrene emissions while maintaining good adhesion properties. The results of styrene suppression and adhesion testing for these resins are shown in Table 5.

TABLE 5

Free-Radical Styrene-Containing Curable Resin System Formulation And Properties

| | Wt. % |
|---|---|
| Reactants | |
| Reichhold 1060-5 Resin (50 NVM in Styrene) | 100.0 |
| Paraffin Wax | 0.15 |
| Fluorocarbon Surfactant | 0.01 |
| Methylethylketone Peroxide Catalyst | 1.0 |
| Properties | |
| Styrene Emissions (By SCAQMD) | 40 g/sq meter |
| Interlaminar Adhesion | Excellent |
| Reactants | |
| Derakane 470 Resin (50 NVM in Styrene) | 100.0 |
| Paraffin Wax | 0.15 |
| Fluorocarbon Surfactant | 0.01 |
| Methylethylketone Peroxide Catalyst | 1.0 |
| Properties | |
| Styrene Emissions (By SCAQMD) | 47 g/sq meter |
| Interlaminar Adhesion | Excellent |

The free-radical curable styrene-containing resin compositions made according to the invention have many advantages. First, the resins of the invention have reduced styrene emissions to meet new environmental standards. Second, the resins have good physical properties including toughness, impact strength, interlaminar adhesion and chemical resistance. Third, they enable a formulation which is simple and inexpensive to process.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

That which is claimed is:

1. A method for making a free-radical curable, styrene-containing resin composition having reduced styrene emissions reacting a polymerizable alpha, beta-ethylenically unsaturated carboxylate resin, which is dissolved in styrene, with (a) from about 0.05 wt. % to about 0.3 wt. % paraffin wax; and (b) from about 0.001 wt. % to about 0.1 wt. % fluorocarbon surfactant.

2. The method of claim 1 wherein the polymerizable alpha, beta-ethylenically unsaturated carboxylate resin comprises an unsaturated polyester.

3. The resin composition of claim 1 wherein the polymerizable alpha, beta-ethylenically unsaturated carboxylate resin comprises a vinyl ester.

4. The resin composition of claim 1 wherein the polymerizable alpha, beta-ethylenically unsaturated carboxylate resin comprises a urethane acrylate or methacrylate.

5. The resin composition of claim 1 wherein the fluorocarbon surfactant comprises a nonionic, ethoxylated fluorine compound.

6. The resin composition of claim 1 wherein the polymerizable alpha, beta-ethylenically unsaturated carboxylate resin is an unsaturated polyester.

7. The resin composition of claim 6 wherein the unsaturated polyester comprises an oligomer obtained by the condensation reaction of at least one unsaturated di- or polycarboxylic acid or anhydride with at least one di- or polyhydric alcohol, and at least one saturated or aromatic di- or polycarboxylic acid or anhydride.

8. The resin composition of claim 7 wherein the unsaturated di- or polycarboxylic acid or anhydride comprises maleic anhydride, the di- or polyhydric alcohol comprises propylene glycol, and the saturated or aromatic di- or polycarboxylic acid or anhydride comprises isophthalic acid.

* * * * *